Figure 1:
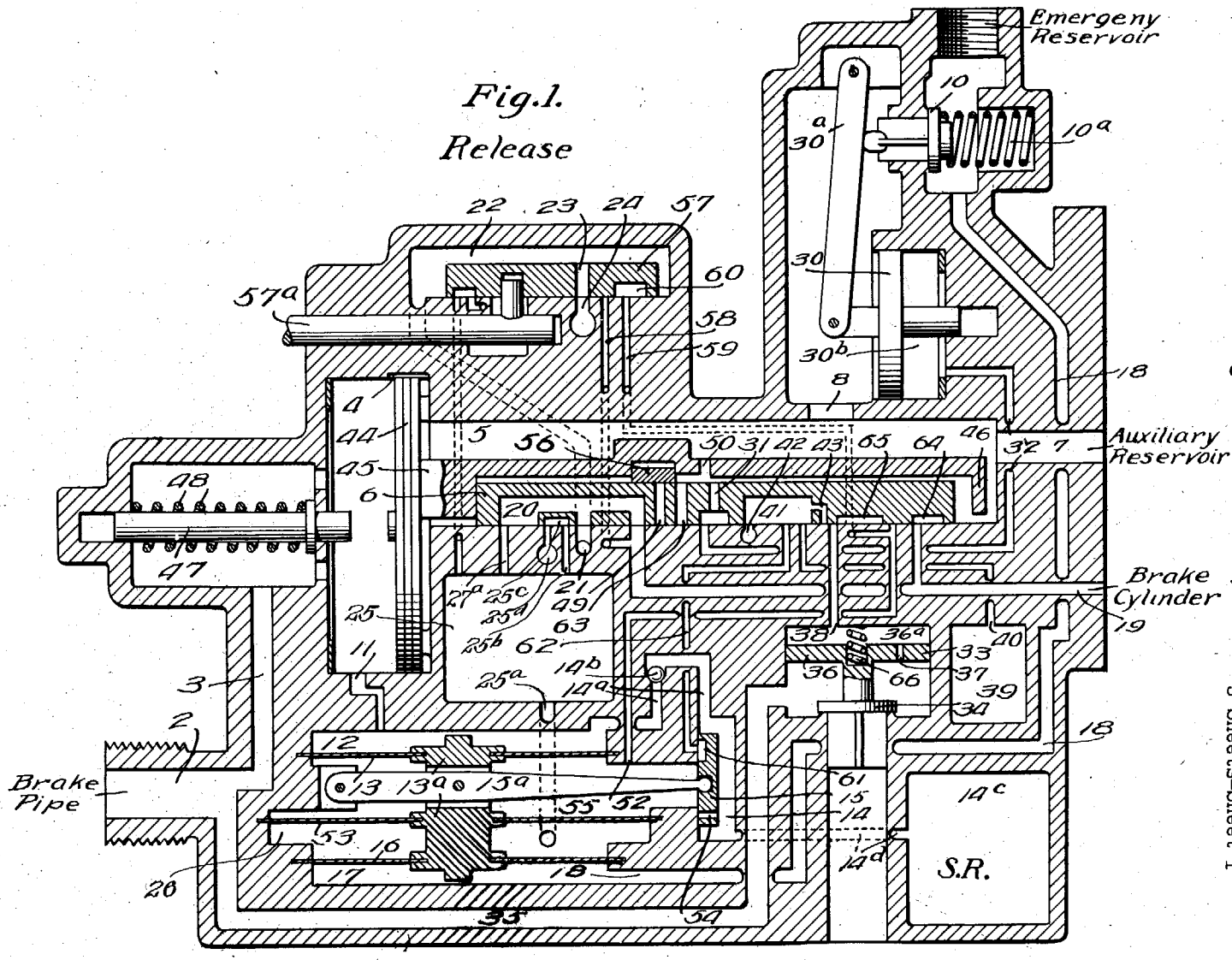

July 10, 1928. S. G. NEAL Re. 17,029

AIR BRAKE APPARATUS

Original Filed Feb. 21, 1925 3 Sheets-Sheet 1

Release

INVENTOR
Spencer G. Neal
BY
ATTORNEYS

July 10, 1928. S. G. NEAL Re. 17,029

AIR BRAKE APPARATUS

Original Filed Feb. 21, 1925 3 Sheets-Sheet 2

INVENTOR
Spencer G. Neal
BY
ATTORNEYS

July 10, 1928.

S. G. NEAL

AIR BRAKE APPARATUS

Re. 17,029

Original Filed Feb. 21, 1925

3 Sheets-Sheet 3

Emergency

INVENTOR

Spencer G. Neal

BY

ATTORNEYS.

Reissued July 10, 1928. Re. 17,029

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

AIR-BRAKE APPARATUS.

Original No. 1,601,583, dated September 28, 1926, Serial No. 10,816, filed February 21, 1925. Application for reissue filed August 3, 1927. Serial No. 210,442.

This invention relates to improvements in triple valves of the Westinghouse type. In triple valves of this type the main piston, the main slide valve and the graduating valve are moved to release and charging position by an increase in brake pipe pressure. Upon a reduction of brake pipe pressure for an application of the brakes the auxiliary reservoir pressure moves the main piston and the connected main and graduating valves into application position and air flows from the auxiliary reservoir to the brake cylinder. When the auxiliary reservoir pressure has been sufficiently reduced through the flow of air to the brake cylinder the brake pipe pressure will move the main piston and the graduating valve to lap position.

One of the important objects of this invention is to provide a triple valve of the Westinghouse type with a main valve means and a supplementary valve means, the main valve means controlling communication between the auxiliary reservoir and the brake cylinder and between the brake cylinder and the atmosphere, and the supplementary valve means controlling communication between a supplementary reservoir and the brake cylinder and between the brake cylinder and the atmosphere, both of said valve means moving to application position upon a reduction in brake pipe pressure and moving to release position upon an increase in brake pipe pressure.

Another important object of the invention is to provide the supplementary valve with means whereby said valve will be controlled by brake pipe, brake cylinder and emergency reservoir pressures and will act as a brake cylinder pressure controlling valve, using air from the supplementary reservoir to compensate for brake cylinder leaks.

Another important object of the invention is to provide means whereby the supplementary or pilot valve will act as a brake cylinder pressure controlling means and ensure a brake cylinder pressure substantially in direct proportion to the brake pipe reduction regardless of brake cylinder piston travel and brake cylinder leakage, using air from the supplementary reservoir to build up brake cylinder pressure and opening the brake cylinder to atmosphere when the brake cylinder pressure is above the desired pressure.

Another object of the invention is to provide a triple valve, of the type herein described, with a release governing valve having two positions, in one of which the main slide valve in release position will bring about a normal full and quick release of the brakes, the release governing valve in its other position rendering the main slide valve ineffective in release position, the release of brake cylinder pressure then being controlled entirely by the supplementary or pilot valve.

There are many other important objects and advantages of the invention which will hereinafter appear.

In order to simplify the description the various ports and passages will be described in connection with the various operations of the triple valve.

Figure 2:
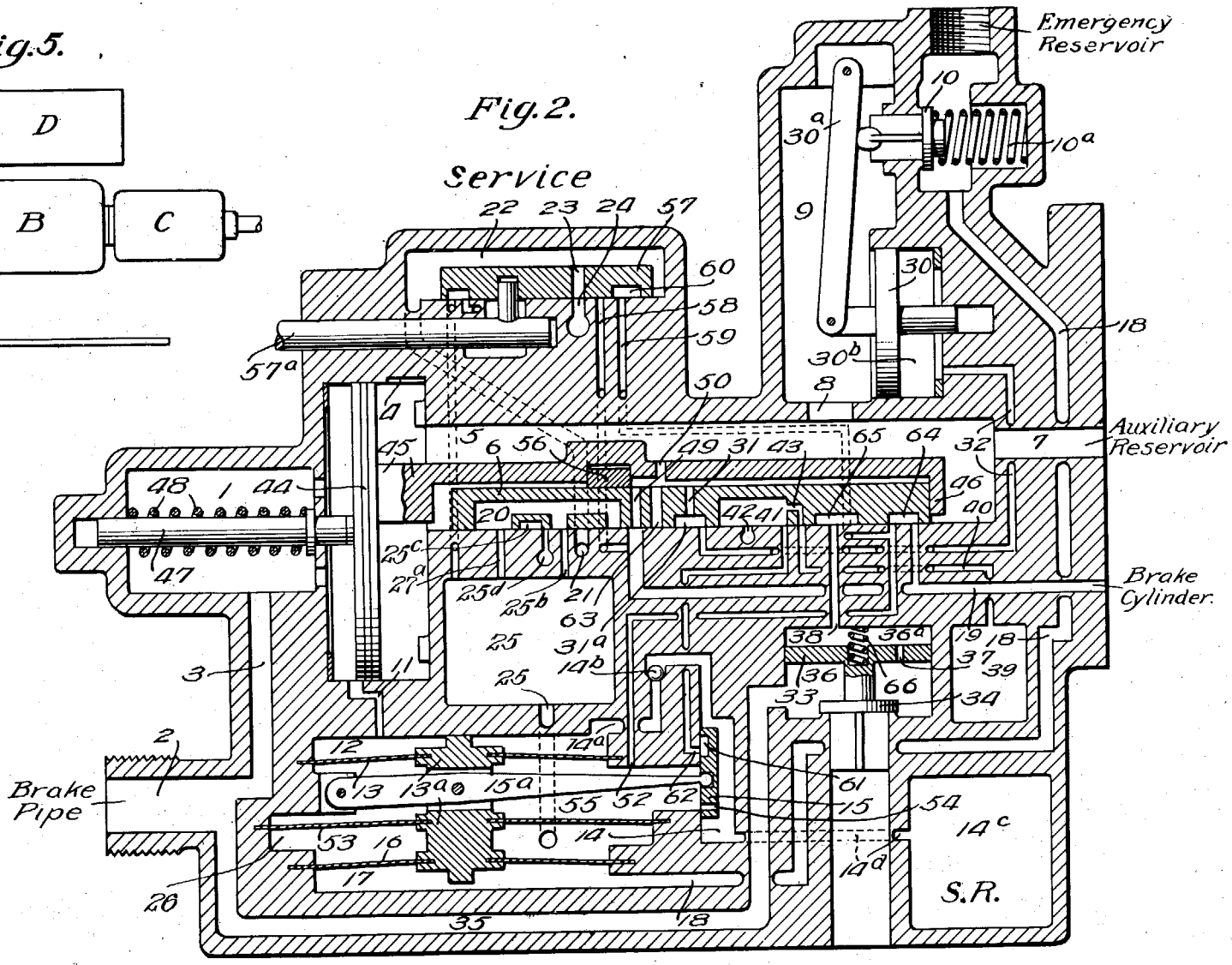
Figure 5:
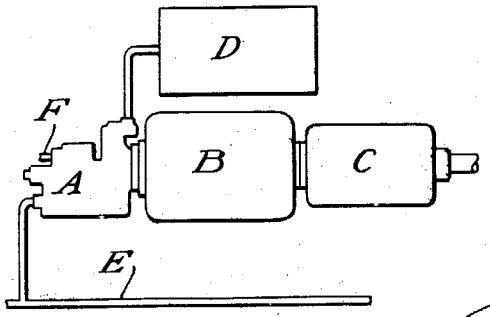
Figures 3, 4:
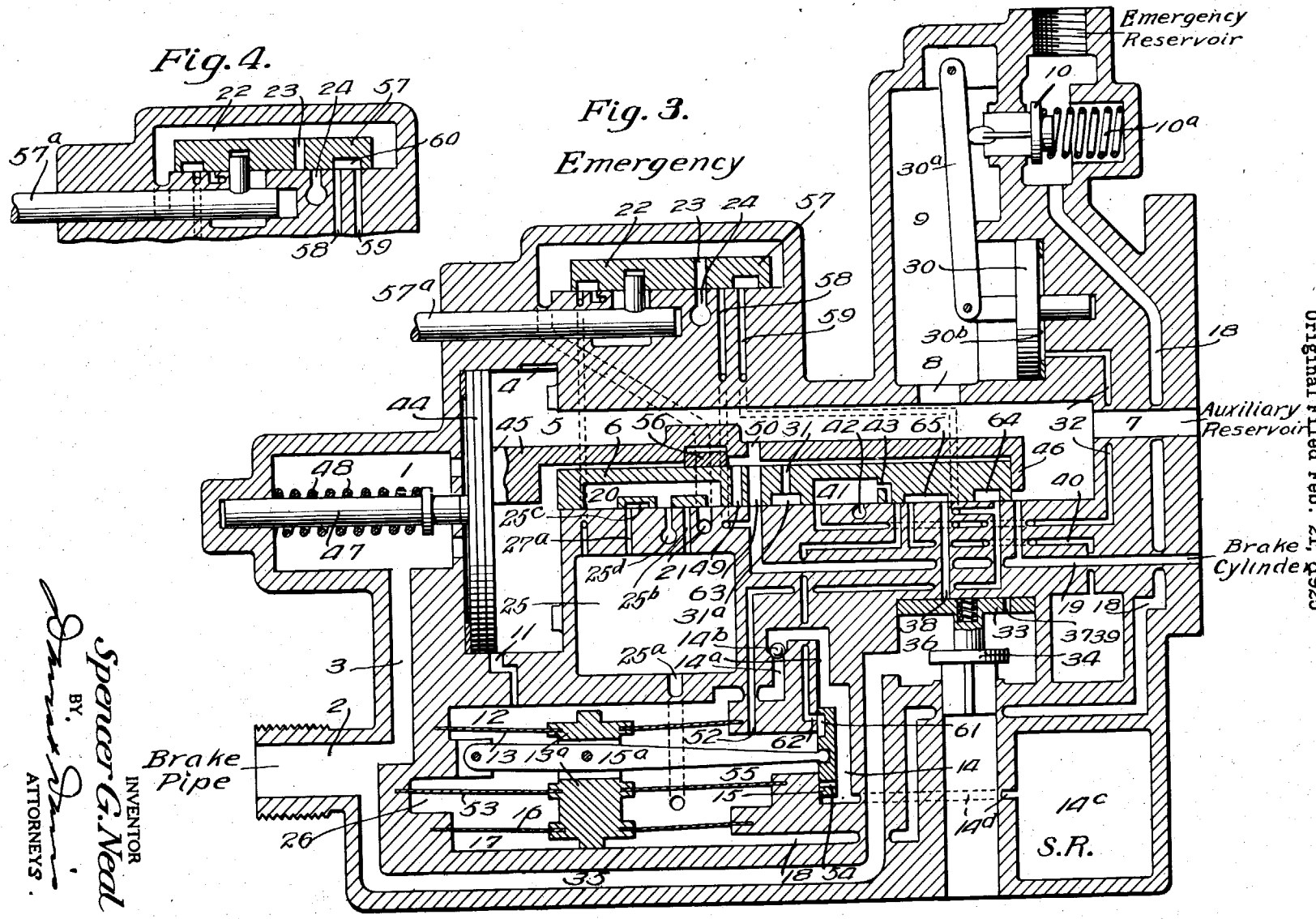

In the drawings, Fig. 1 is a diagrammatic sectional view of the triple valve embodying the invention, the parts being shown in full release and charging position, the release governing valve being in quick release position;

Fig. 2 a view similar to Fig. 1 showing the parts in service position;

Fig. 3 a view similar to Fig. 1 showing the parts in emergency position;

Fig. 4 a detail sectional view of the release governing valve showing the valve in graduated release position; and Fig. 5 a diagrammatic view of the apparatus.

In Fig. 5, A designates the triple valve; B the auxiliary reservoir; C the brake cylinder; D the emergency reservoir; E the brake pipe; and F the release governing valve stem.

*Full release and charging position.*

The system is charged by increasing the brake pipe pressure, as in the present standard Westinghouse type of air brake apparatus. The air pressure from the brake pipe flows through the brake pipe connection 2, the connected passage 3 into the main piston chamber 1. The increasing pressure in chamber 1 forces the main piston 44 inwardly, toward the right hand as viewed in the drawings. Connected to the piston is the usual valve stem 45, said stem extending inwardly through the main slide valve chamber 5 and being connected to the main slide valve 6 and the graduating valve 56 in the usual manner. The piston stem is connected to the main slide valve by a lost motion connection and the graduating valve is connected directly to the said stem as is usual in this type of apparatus. The main slide valve operates on a main slide valve seat through which various ports and passages are formed. With the main piston in full release and charging position a charging groove 4 is uncovered so that air may flow from chamber 1 through said groove past the piston 44 and into the main slide valve chamber 5. The main slide valve chamber is connected directly to the auxiliary reservoir through passage 7. Said chamber 5 is also connected to an emergency reservoir through passage 8, chamber 9 and a port controlled by a spring pressed check valve 10. The spring $10^a$ normally holds the check valve seated and the rising pressure in chamber 9 will unseat said valve and open communication between chamber 9 and the emergency reservoir. The auxiliary reservoir and the emergency reservoir will therefore be charged at the same time and at the same rate. From chamber 1 brake pipe air will flow through the passage 11 into brake pipe chamber 12 of the diaphragm structure. The lower wall of chamber 12 is formed by a brake pipe diaphragm 13. Spaced a suitable distance below the diaphragm 13 is a larger brake cylinder diaphragm 53, said diaphragm being considerably larger in area than the brake pipe diaphragm 13. The diaphragms 13 and 53 form the upper and lower walls of a brake cylinder chamber 55. Below the brake cylinder diaphragm 55 is arranged an emergency reservoir diaphragm 16, this diaphragm being of the same area as the brake pipe diaphragm 13. Between the diaphragms 53 and 16 is formed a retention chamber 26; and below the emergency reservoir diaphragm 16 is formed an emergency reservoir chamber 17. This latter chamber is connected to the emergency reservoir by passage 18 so that said chamber will be charged with emergency reservoir air.

The diaphragms 13, 53 and 16 are rigidly connected together at their centers by a stem $13^a$ and move up and down together. These diaphragms have a limited up-and-down movement, suitable stops being provided for that purpose. In the brake cylinder equalizing chamber 55 is arranged a horizontal lever $15^a$ which is pivotally connected to the stem $13^a$. One end of said lever is pivotally connected to the valve casing; its other end being connected to a secondary or pilot valve 15, said valve being arranged in a valve chamber 14. The chamber 14 is connected to the brake pipe chamber 12 by a passage $14^a$, and in said passage is a check valve $14^b$. This check valve permits air to flow into chamber 14 from chamber 12 but prevents a back flow of air from chamber 14. Chamber 14 is directly connected to a supplementary reservoir $14^c$ by passage $14^d$. Brake pipe pressure will flow from chamber 12 past check valve $14^b$ into chamber 14 and then into the supplementary reservoir $14^c$.

With the triple valve parts in full release and charging position, with the release governing valve in quick release position, as shown in Fig. 1, the brake cylinder is in direct communication with atmosphere through brake cylinder passage 19, cavity 20 of the main slide valve, passage 21 which leads direct to the release governing valve chamber 22, and from this chamber to atmosphere through port 23 in the release governing valve 57, and main atmospheric port 24.

The check valve 10 is opened for emergency applications of the brakes by means of a piston 30 and a lever $30^a$ connected thereto and adapted to bear on the projecting end of the valve 10. The piston 30 reciprocates in a chamber $30^b$ and said chamber is charged from the main slide valve chamber through port 31 and cavity $31^a$ in the main slide valve and port and passage 32 which leads from the main slide valve seat into chamber $30^b$. The piston 30 therefore is subject on one side to the pressure in chamber 9 and on its other side to the pressure in chamber $30^b$ and said piston remains inoperative in all positions of the main slide valve except the emergency position, as will be hereinafter described.

A chamber 25 is connected by passage $25^a$ to the retention chamber 26 and is for the purpose of augmenting said chamber 26. The chamber 25 has no function except in graduated release operations, as will be hereinafter described. With the release governing valve in quick release position, as shown in Fig. 1, chamber 25 is vented directly to atmosphere through passage 27, cavity 28 of the release governing valve, and port and passage 29 which leads direct to atmosphere. Chamber 25 is also connected to atmosphere through a small blow down port $25^b$ which leads to the main slide valve seat and into a cavity $25^c$ in the main slide valve. The cavity $25^c$ connects the port $25^b$ to an atmospheric port $25^d$. The chamber 25 is connected by a port $27^a$ to the main slide valve seat and in the release position of the main slide valve this port registers with the cavity 20 in the main slide valve so that the chamber 25 is directly connected to the brake cylinder port and passage 19.

In emergency application the brake pipe is vented to atmosphere by opening the emergency brake pipe vent valve 34. This valve is connected to a piston 33 which reciprocates in a chamber 36—$36^a$. The chamber 36 below the piston 33 is connected directly to the brake pipe by passage 35. The piston 33 is provided with a small leak port 37 through which air will pass from chamber 36 into the chamber 36[a] above said piston. Brake pipe pressure will thereby equalize on opposite sides of the piston 33 and the valve 34 will be held closed. A passage 38 leads from the chamber 36[a] above the piston 33 to the main slide valve seat. In the emergency position of the main slide valve passage 38 is connected by a cavity 65 in the main slide valve to a port and passage 40 which leads directly into a chamber 39 thereby reducing the pressure in chamber 36[a] and permitting the brake pipe pressure in chamber 36 to raise the piston 33 and open the valve 34. In the release and service positions of the main slide valve chamber 39 is connected direct to atmosphere through cavity 41, and secondary atmospheric port 42, as will be more fully hereinafter described. In the service position of the main slide valve this communication is through port 43 and cavity 41.

*Service position.*

A service application of the brakes is brought about by a service reduction in brake pipe pressure in the usual manner and the pressure in chamber 1 will be reduced below the auxiliary pressure in chamber 5. When a given differential in pressure has been established in these two chambers piston 44 and the stem 45 which is connected thereto, and the main and graduating valves will be moved toward the left by the superior auxiliary reservoir pressure in chamber 5. The initial movement of the piston and the stem 45 will first take up the lost motion between the extension 46 of the stem and the main slide valve. This initial movement will also move the graduating valve to uncover the service port 49 in the main slide valve. Thereafter the main slide valve will move with the piston stem until the piston engages the graduating stem 47 where it will be stopped in service position. The movement of the stem 47 is resisted by the graduating spring 48, said spring having sufficient tension to hold the piston and the main slide valve in service position when a service reduction in brake pipe pressure has been made, (see Fig. 2). The movement of the main slide valve to service position closes communication between the brake cylinder passage 19 and the release cavity 20 of the slide valve 6 and the service port 49 is brought into register with the brake cylinder passage 19. Auxiliary reservoir air is then free to flow from chamber 5 direct to the brake cylinder through the passage 50 in the stem 45, port 49 of the main slide valve and the brake cylinder passage 19 which leads direct to the brake cylinder. The size of the service port 49 is such as to permit a reduction of the auxiliary pressure at practically the same rate as a service reduction of brake pipe pressure. The purpose of this uniform reduction of both the brake pipe pressure and the auxiliary reservoir pressure is to prevent a pressure differential on piston 44 that would tend to compress the graduating spring 48, thus preventing the piston and the slide valves operating to emergency position when a brake pipe reduction is made only at a service rate. In this service position of the main slide valve chamber 30[b] will be in direct communication with the auxiliary reservoir chamber 5 through passage 32, cavity 31[a] and port 31 of the main slide valve and passage 50 in the main slide valve stem, with the result that there will be no movement of the piston 30 and the emergency reservoir will remain sealed. The brake cylinder will be connected to the equalizing chamber 55 of the pilot valve structure through passage 51, cavity 64 of the main slide valve and passage 52 which leads direct to chamber 55. This communication permits the supplementary or pilot valve to both supply and release air from the brake cylinder so long as the main slide valve 6 is in service position.

The reduction of brake pipe pressure in chamber 1 will result in a corresponding reduction of pressure in the brake pipe chamber 12 of the diaphragm structure, resulting in an upward movement of the valve 15. This upward movement results from the reduction of the pressure in chamber 12 below the undisturbed emergency reservoir pressure in chamber 17 beneath the diaphragm 16. When the pilot valve 15 has been moved upwardly into service position supplementary reservoir air will flow to the brake cylinder through port 54 in the pilot valve equalizing chamber 55, passage 52, cavity 64 of the main slide valve and passage 51 which leads direct into the brake cylinder passage 19. It is therefore clear that in the service position of the main slide valve air will flow to the brake cylinder from auxiliary reservoir through the main slide valve and also from the supplementary reservoir to the brake cylinder through the independent pilot valve. Supplementary reservoir air will be used in building up the initial application pressure in the brake cylinder and thereafter will be used by the supplementary valve in compensating for brake cylinder leaks.

*Service lap position.*

The means which establishes the dual communication between the auxiliary reservoir and the brake cylinder and the supplementary reservoir and the brake cylinder, are lapped independently of each other. The main valve means controlling communication between the auxiliary reservoir and the brake cylinder is lapped on the volumetric principle whereby the main slide valve and piston will be operated to the right to cause the graduating valve to cut off communication between chamber 5 and port 49 of the slide valve when the pressure in chamber 5 has been reduced slightly below the brake pipe pressure in chamber 1. This operation, as in the standard Westinghouse type of freight triple valve, takes place when a given volume has been exhausted from the auxiliary reservoir, and the effectiveness in resultant brake cylinder pressure is determined by the length of the brake cylinder piston travel, which, of course, governs the brake cylinder volume. The connection between the supplementary reservoir and the brake cylinder controlled by the secondary valve means is closed when a given brake cylinder pressure has been developed, this pressure being registered at all times in the equalizing chamber 55, and when this pressure is raised to a point where the reduced brake pipe pressure in chamber 12 and the increase in pressure in the equalizing chamber 55 will oppose the undisturbed emergency reservoir pressure in chamber 17, the pilot valve will be moved downward to lap position and the service port of the pilot valve will be closed. Should the piston travel be short or less than normal (8″) an abnormal brake cylinder pressure will be developed before the graduating valve 56 will be lapped, and the pressure in the equalizing chamber 55 between diaphragms 13 and 53 will likewise be abnormal. The diaphragms will be lowered and the pilot valve will be moved to release position and communication will be established between the brake cylinder and atmosphere so that the abnormal, developed, brake cylinder pressure will be reduced to normal pressure by the balancing operation of the diaphragms. Should the piston travel be greater than normal the flow of auxiliary reservoir pressure to the brake cylinder will not develop a normal pressure therein, with the result that the pilot valve will be raised to or held in service position by the diaphragms and supplementary reservoir pressure will then flow to the brake cylinder to make up any pressure which was lacking at the time the graduating valve assumed lap position. If the brake pipe pressure is held constantly at any predetermined service reduction, the brake cylinder will be maintained against leakage by the diaphragm operated pilot valve 15 alone; but should another service brake pipe reduction be made, air pressure will flow to the brake cylinder both from the auxiliary and the supplementary reservoirs.

Air will be used from the supplementary reservoir for the initial application of the brakes and thereafter in compensating for brake cylinder leaks until the pressure therein has been reduced below the brake pipe pressure in chamber 12. When the pressure in the chamber 14[c] has been reduced below that of chamber 12 air will flow past check valve 14[b] from the said chamber 12. This reduction in pressure in chamber 12 and consequently in the brake pipe will, if sufficient, cause the main valve means to move to application position to again connect the auxiliary reservoir to the brake cylinder.

*Quick release.*

The release governing valve 57 is arranged to be manually operated by means of the stem 57[a]. This valve has two positions, a quick release position and a graduated release position. In its quick release position the large release port 23 connects the release governing valve chamber 22 to the large atmospheric port 24. This position of the valve is illustrated in Fig. 1.

A release of brake cylinder pressure is obtained by increasing the brake pipe pressure in the usual manner. When the brake pipe pressure is raised in chamber 1 to exceed the pressure in the auxiliary reservoir chamber 5 sufficiently to operate the piston and the main slide valve to release position communication will be established from the brake cylinder direct to atmosphere through the release cavity 20 of the main slide valve and thence to atmosphere through the release governing valve chamber 22 as described in connection with the charging of the system. The auxiliary reservoir will be recharged from the brake pipe through the charging groove 4 as hereinbefore described. It will not be necessary, however, to charge the emergency reservoir because the air in said reservoir has been maintained undisturbed. The movement of the main slide valve to release position carries the cavity 64 out of register with the ports 51 and 52 thereby preventing the pilot valve from feeding brake pipe pressure to the brake cylinder when the brake pipe pressure is raised at a slow rate for release of the brakes. The increased brake pipe pressure in chamber 1 will be directly registered in the brake pipe chamber 12 of the diaphragm structure and the diaphragms will be moved downwardly and will carry the pilot valve to release position. In the release position of this valve the equalizing chamber 55 will be connected to atmosphere through cavity 61 in the pilot valve, passage 62, cavity 41 of the main slide valve and atmospheric port 42. The pressure in chamber 55 will not be completely exhausted to atmosphere until the brake pipe pressure in chamber 12 has been raised to an equality with the undisturbed reservoir pressure in chamber 17.

The equalizing chamber 55 will be cut off from communication with the brake cylinder when cavity 64 has been moved out of register with passage 52. If the communication between passages 51 and 52 were not cut off and main slide valve did move to release position the operation would be as follows: The slow increase in brake pipe pressure, such as does exist in a long train when releasing the brakes, would operate the pilot valve to release position, and the brake cylinder pressure would be released through the diaphragm structure, at a rate proportional to the increase in brake pipe pressure. But when the main slide valve is operated to release position to quickly exhaust the brake cylinder pressure, the pressure in the equalizing chamber 55 is also reduced at the same rate and the result would be that because of the quick reduction of pressure in chamber 55 the pilot valve would operate to service position and feed brake pipe air into the brake cylinder in the same manner as it would when maintaining brake cylinder leakage. With the communication closed between passages 51 and 52, the pilot valve operation is precisely as just described, but the brake pipe pressure entering passage 52 cannot flow to the brake cylinder through passage 51 because the cavity 64 has been moved out of register with passage 52.

*Service application when operating in graduated release.*

The release governing valve is shifted to the left, as illustrated in Fig. 4 of the drawings, in order to adjust the triple valve for graduated release operations. This movement of the release governing valve closes the large atmospheric port 24 and closes the atmospheric port 29. This movement of the valve therefore closes communication between the retention chamber 25 and atmospheric port 29 and also communication between the brake cylinder exhaust port 21 and the atmospheric port 24. A cavity 60 in the release governing valve will connect together passages 58 and 59. Passage 58 leads direct to the brake cylinder passage 19. Passage 59 leads direct to passage 52. Passage 52 leads from the main slide valve seat direct to the brake cylinder pressure equalizing chamber 55. When, therefore, the release governing valve is in graduated release position the equalizing chamber 55 is connected in all positions of the main slide valve, and independently of the main slide valve, with the brake cylinder passage 19. The service operation of the triple valve as a whole is precisely as described under the heading "Service position", the main slide valve in service position connecting the auxiliary reservoir to the brake cylinder and the independent or supplementary valve 15 connecting the supplementary reservoir to the brake cylinder. With the release governing valve in graduated release position the equalizing chamber 55 is connected to the brake cylinder through passage 52, passage 59, cavity 60 in the release governing valve, passage 58 to the brake cylinder passage 19 so that supplementary reservoir air will flow to the brake cylinder independently of the main slide valve.

*Graduated release.*

The release operation, when operating in graduated release, is wholly controlled by the indepedent pilot valve 15, the release movements of the main slide valve being idle in graduated release operations.

When operating in graduated release, an increase in brake pipe pressure will operate the piston and main slide valve to release position as hereinbefore described, but the brake cylinder pressure cannot be quickly released to atmosphere because the port 23 of the release governing valve is moved out of register with the atmospheric port 24. The purpose of connecting the passages 58 and 59 by the cavity 60 of the release governing valve is to permit the pilot valve to release brake cylinder pressure to atmosphere while the main slide valve is in release position; this being prevented when operating in quick release, as herein described. The flow of air from the brake cylinder to atmosphere will be, when operating in graduated release, as follows: Brake cylinder pressure will flow through passages 19 and 58, cavity 60 of the release governing valve and passages 59 and 52, which lead direct to the equalizing chamber 55 between diaphragms 13 and 53, and from this chamber to the atmosphere through cavity 61 to the pilot valve passage 62, cavity 41 of the main slide valve, and the atmospheric port 42.

From the above description it will be understood that when operating in graduated release the brake cylinder is supplied with pressure both from the auxiliary reservoir and the supplementary reservoir when a brake pipe reduction is made; but the discharge of pressure therefrom is controlled entirely by the pilot valve and the amount of pressure reduction is dependent upon the amount of increase in brake pipe pressure.

The release of brake cylinder pressure will be in direct proportion to the increase in brake pipe pressure registered in the brake pipe chamber 12. By increasing the pressure in chamber 12 a predetermined amount, for instance five pounds, the diaphragm structure will be moved downwardly and the pilot valve will be moved to release position. Brake cylinder pressure in chamber 55 will be released to atmosphere as hereinbefore described. When the pressure in chamber 55, and consequently in the brake cylinder, is reduced to such a degree that the undisturbed emergency reservoir pressure in chamber 17 will overcome the opposing pressures in the brake pipe chamber 12 and in the equalizing chamber 55 the diaphragms will be moved upwardly and the pilot valve will be moved to lap position to prevent further escape of air from the chamber 55 and from the brake cylinder. If it be desired to still further reduce brake cylinder pressure a further increase in brake pipe pressure will be made and the release operation will be repeated. If it be desired to increase the brake cylinder pressure the brake pipe pressure will be reduced and the pilot valve will move to application position and the main slide valve will also move to application position. In this manner the brake cylinder pressure may be increased or diminished by steps by decreasing or increasing the brake pipe pressure.

*Emergency position.*

The brake pipe pressure is reduced in the usual manner at an emergency rate for an emergency application of the brakes. This emergency reduction in chamber 1 will be sufficient to permit the auxiliary reservoir pressure in chamber 5 to move the main piston 44 to the extreme limit of its movement toward the left against the tension of the graduating spring 48. This movement of the piston and the piston stem will carry the main slide valve to emergency position as shown in Fig. 3. With the main slide valve in emergency position the chamber 30[b] will be vented to atmosphere through passage 32, cavity 41 of the main slide valve and atmospheric port 42. Auxiliary reservoir pressure in chamber 9 will thereupon force the piston 30 inwardly to the position shown in Fig. 3 and the lever 30[a] will unseat the check valve 10 and permit the emergency reservoir air to flow direct to the chamber 5 through chamber 9 and passage 8. Air from the auxiliary reservoir and the emergency reservoir will flow direct to the brake cylinder through the emergency port 63 of the main slide valve and brake cylinder passage 19.

The brake pipe vent valve is opened to effect a rapid and positive serial emergency action throughout the train. When the main slide valve is in emergency position the chamber 36[a] above the vent valve piston 33 is vented into the chamber 39 through passage 38, cavity 65 in the main slide valve, port and passage 40 which leads to the chamber 39. Chamber 39 is at atmospheric pressure in all positions of the main slide valve except emergency position. When the chamber 36[a] is vented, as described, the brake pipe pressure below the piston 33 will raise said piston and open the brake pipe vent valve 34, thereby permitting brake pipe pressure to flow directly to atmosphere. When the brake pipe pressure has been reduced sufficiently to bring about approximately an equalization between the pressure above and below the piston 33 the valve 34 will be closed by the spring 66 and the air velocity past the valve. The emergency operation of the triple valve, whether operated in graduated release or in quick release, is precisely as described, except that when operating in graduated release any pressure existing in the retention chamber at the time of the emergency operation will be held or trapped therein. Pressure in all of the other chambers of the triple valve will be equalized. As shown in Fig. 3 air will flow from chamber 5 into chamber 12 through passage 11 when the main piston 44 is in emergency position so that the pressures in chambers 12, 55 and 17 will be equalized.

With the release governing valve in quick release position the main slide valve in emergency position will render the supplementary valve ineffective by closing passages 52 and 62, and the air in the supplementary reservoir will be trapped therein. With the release governing valve in graduated release position there will be a discharge of a part of the air in the supplementary reservoir to the brake cylinder before the supplementary valve is moved to lap position. Air will leak through the port 37 to more quickly bring about an equalization of pressures on opposite sides of the piston 33.

*Release of the brakes after an emergency application.*

The release of the brakes after an emergency application is obtained by increasing the brake pipe pressure above the brake cylinder pressure existing in chamber 5 at the right side of piston 44. The parts will then assume release position and the system will again be charged as described. Should the release governing valve be in graduated release position, the release of the brake cylinder pressure will be controlled entirely by the pilot valve and will be reduced at a slow rate, whereas should this valve be in quick release position, the brake cylinder pressure will be quickly released through the main slide valve and release governing valve.

In my copending application Serial Number 9789, filed February 17th, 1925, I have claimed the main features of the triple valve described herein. The rising brake pipe pressure in chamber 36 will leak through the port 37 in order to maintain an equalization of pressures on opposite sides of the piston 33.

What I claim is:

1. An air brake apparatus comprising an emergency reservoir, an auxiliary reservoir, a supplemental reservoir, a brake pipe, a brake cylinder, means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon an equalization of pressures in the brake pipe and in the auxiliary reservoir whereby a certain volume of air will be discharged from the auxiliary reservoir to the brake cylinder for a given brake pipe reduction, and means operated by emergency reservoir pressure upon a reduction of brake pipe pressure to place the supplementary reservoir in communication with the brake cylinder, said means closing said communication when the combined brake cylinder pressure and reduced brake pipe pressure dominates the emergency reservoir pressure and thereafter controlling the degree of pressure retained in the brake cylinder.

2. An air brake apparatus comprising an emergency reservoir, an auxiliary reservoir, a supplementary reservoir, a brake pipe, a brake cylinder, means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon an equalization of pressures in the brake pipe and in the auxiliary reservoir whereby a certain volume of air will be discharged from the auxiliary reservoir to the brake cylinder for a given brake pipe reduction, and means operated by emergency reservoir pressure upon a reduction of brake pipe pressure to place the supplementary reservoir in communication with the brake cylinder, said means closing said communication when the combined brake cylinder pressure and reduced brake pipe pressure dominates the emergency reservoir pressure.

3. An air brake apparatus comprising an emergency reservoir, an auxiliary reservoir, a supplementary reservoir, a brake cylinder, a brake pipe, and two valve devices operated by a reduction of brake pipe pressure, one of said valve devices closing communication between brake pipe and auxiliary reservoir and placing the auxiliary reservoir in communication with the brake cylinder and closing said brake cylinder communication upon an equalization of brake pipe and auxiliary reservoir pressures, whereby a certain volume of air will be discharged from the auxiliary reservoir into the brake cylinder for a given brake pipe reduction, the other valve device placing the supplementary reservoir in communication with the brake cylinder and closing said communication when a predetermined brake cylinder pressure is secured from auxiliary reservoir and supplementary reservoir.

4. An air brake apparatus comprising an emergency reservoir, an auxiliary reservoir, a supplementary reservoir, a brake cylinder, a brake pipe, and two valve devices operated by a reduction of brake pipe pressure, one closing communication between brake pipe and auxiliary reservoir and placing the auxiliary reservoir in communication with the brake cylinder and closing said brake cylinder communication upon an equalization of brake pipe and auxiliary reservoir pressures, whereby a certain volume of air will be discharged from the auxiliary reservoir into the brake cylinder for a given brake pipe reduction, the other valve device placing the supplementary reservoir in communication with the brake cylinder and closing said communication when a predetermined brake cylinder pressure is secured from the auxiliary reservoir and supplementary reservoir, said other valve device being controlled by brake pipe, brake cylinder and emergency reservoir pressures.

5. An air brake apparatus comprising an emergency reservoir, an auxiliary reservoir, a supplementary reservoir, a brake cylinder, a brake pipe, a main valve device and a secondary valve device both of said devices being operated by a reduction of brake pipe pressure, the main valve device closing communication between the brake pipe and auxiliary reservoir and placing the auxiliary reservoir in communication with the brake cylinder and closing said brake cylinder communication upon an equalization of brake pipe and auxiliary reservoir pressures, whereby a certain volume of air will be discharged from the auxiliary reservoir into the brake cylinder for a given brake pipe reduction, said main valve device also operating upon a sudden reduction of brake pipe pressure to place the emergency reservoir and auxiliary reservoir in communication with the brake cylinder for an emergency application of the brakes, the secondary valve device placing the supplementary reservoir in communication with the brake cylinder and closing said communication when a predetermined brake cylinder pressure is secured from auxiliary reservoir and supplementary reservoir, said secondary valve device being controlled by brake pipe, brake cylinder and emergency reservoir pressures.

6. A triple valve for air brake apparatus comprising a main slide valve, a graduating valve, a piston connected to said valves and subject on one side to brake pipe pressure and on its other side to auxiliary reservoir pressure and operating upon an increase of brake pipe pressure to move said valves to release position to connect the brake cylinder to a main exhaust port and to open communication from the brake pipe to auxiliary reservoir, and operating upon a reduction of brake pipe pressure to move said valves to application position to connect the auxiliary reservoir to the brake cylinder and to close communication from the brake pipe to auxiliary reservoir, said communication with the brake cylinder being closed upon an equalization of pressures in the brake pipe and in the auxiliary reservoir whereby a certain volume of air will be discharged from the auxiliary reservoir to the brake cylinder for a given brake pipe reduction, a secondary or pilot valve subject to brake pipe, brake cylinder and emergency reservoir pressures and operating upon a reduction in brake pipe pressure to connect a supplementary reservoir to the brake cylinder and operating upon an increase in brake pipe pressure to connect the brake cylinder to atmosphere through a secondary exhaust port, a release governing valve having a quick release position and a graduated release position, said valve in quick release position opening the main brake cylinder exhaust port to atmosphere and in its graduated release position closing said main exhaust port and opening communication between the brake cylinder and the secondary exhaust port through the pilot valve whereby the pilot valve will control the exhaust of brake cylinder pressure when the release governing valve is in graduated release position, and means whereby the main slide valve will control brake cylinder exhaust through the pilot valve and the secondary exhaust port.

7. An air brake apparatus comprising an emergency reservoir, an auxiliary reservoir, a supplementary reservoir, a brake pipe, a brake cylinder, main valve means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon an equalization of pressures in the brake pipe and in the auxiliary reservoir whereby a certain volume of air will be discharged from the auxiliary reservoir to the brake cylinder for a given brake pipe reduction, and a secondary or pilot valve operating upon a reduction of brake pipe pressure to admit supplementary reservoir air only to the brake cylinder until a predetermined pressure is built up in said brake cylinder from the auxiliary reservoir and supplementary reservoir, whereby the predetermined pressure in the brake cylinder will be maintained from the supplementary reservoir regardless of brake cylinder leaks and variations in brake cylinder piston travel.

8. An air brake apparatus comprising an emergency reservoir, an auxiliary reservoir, a supplementary reservoir, a brake pipe, a brake cylinder, main valve means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon an equalization of pressure in the brake pipe and in the auxiliary reservoir whereby a certain volume of air will be discharged from the auxiliary reservoir to the brake cylinder for a given brake pipe reduction, said main valve means operating upon an increase of brake pipe pressure to connect the brake cylinder to a main exhaust port, a secondary valve means operating upon a reduction of brake pipe pressure to place the supplementary reservoir in communication with the brake cylinder and close said communication when a predetermined brake cylinder pressure is secured from the auxiliary reservoir and supplementary reservoir, and operating upon an increase of brake pipe pressure to slowly release brake cylinder pressure to a secondary exhaust port and independent of the main exhaust port of the main valve means, said secondary valve means being controlled by brake pipe, brake cylinder and emergency reservoir pressures, and manually operable means in one position rendering the main exhaust means ineffective and the secondary exhaust means effective and in another position rendering the main exhaust means effective.

9. An air brake apparatus comprising an emergency reservoir, an auxiliary reservoir, a supplementary reservoir, a brake pipe, a brake cylinder, main valve means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon an equalization of pressure in the brake pipe and in the auxiliary reservoir whereby a certain volume of air will be discharged from the auxiliary reservoir to the brake cylinder for a given brake pipe reduction, said main valve means operating upon an increase of brake pipe pressure to connect the brake cylinder to a main exhaust port, a secondary independent valve operating upon a reduction in brake pipe pressure to connect the supplementary reservoir to the brake cylinder and to close said communication when a predetermined brake cylinder pressure is secured from the auxiliary reservoir and the supplementary reservoir and operating upon an increase of brake pipe pressure to release position to connect the brake cylinder to atmosphere, means controlled by brake pipe and brake cylinder pressures opposed to the pressure of an emergency reservoir for actuating said independent valve, and means whereby said pressure controlling valve will maintain the brake cylinder pressure in direct proportion to the brake pipe reduction the brake cylinder pressure moving said independent valve to release position when said pressure exceeds the desired brake cylinder pressure, and emergency reservoir pressure moving said valve to application position when the brake cylinder pressure is below the desired brake cylinder pressure.

10. A triple valve for air brake apparatus comprising a main slide valve, a graduating valve, a piston connected to said valves and subject on one side to brake pipe pressure and on its other side to auxiliary reservoir pressure and operating upon an increase of brake pipe pressure to move the said valves to release position to connect the brake cylinder to a main exhaust port and to open communication from the brake pipe to auxiliary reservoir, and operating upon a reduction of brake pipe pressure to move said valves to application position to connect the auxiliary reservoir to the brake cylinder and to close communication from the brake pipe to auxiliary reservoir, said communication with the brake cylinder being closed upon an equalization of pressures in the brake pipe and in the auxiliary reservoir whereby a certain volume of air will be discharged from the auxiliary reservoir to the brake cylinder for a given brake pipe reduction, and a secondary independent valve operating upon a decrease in brake pipe pressure to connect a supplementary reservoir alone to the brake cylinder through a cavity in the main valve when said slide valve is in service application position.

11. A triple valve for air brake apparatus comprising a main slide valve, a graduating valve, a piston connected to said valves and subject on one side to brake pipe pressure and on its other side to auxiliary reservoir pressure and operating upon an increase of brake pipe pressure to move the said valves to release position to connect the brake cylinder to a main exhaust port and to open communication from the brake pipe to auxiliary reservoir, and operating upon a reduction of brake pipe pressure to move said valves to application position to connect the auxiliary reservoir to the brake cylinder and to close communication from the brake pipe to auxiliary reservoir, said communication with the brake cylinder being closed upon an equalization of pressures in the brake pipe and in the auxiliary reservoir whereby a certain volume of air will be discharged from the auxiliary reservoir to the brake cylinder for a given brake pipe reduction, a secondary independent valve operating upon a decrease in brake pipe pressure to connect a supplementary reservoir alone to the brake cylinder through a cavity in the main slide valve when said slide valve is in service application position, and means controlled by brake pipe and brake cylinder pressures opposed to the pressure of an emergency reservoir for actuating said independent valve.

12. A triple valve for air brake apparatus comprising a main slide valve, a graduating valve, a piston connected to said valves and subject on one side to brake pipe pressure and on its other side to auxiliary reservoir pressure and operating upon an increase of brake pipe pressure to move the said valves to release position to connect the brake cylinder to a main exhaust port and to open communication from the brake pipe to auxiliary reservoir, and operating upon a reduction of brake pipe pressure to move said valves to application position to connect the auxiliary reservoir to the brake cylinder and to close communication from the brake pipe to auxiliary reservoir, said communication with the brake cylinder being closed upon an equalization of pressures in the brake pipe and in the auxiliary reservoir whereby a certain volume of air will be discharged from the auxiliary reservoir to the brake cylinder for a given brake pipe reduction, a quick release valve controlling a main exhaust through the main slide valve and adapted to be manually operated to render the main exhaust through the main slide valve ineffective in release operations, a secondary independent valve operating upon a decrease in brake pipe pressure to connect a supplementary reservoir to the brake cylinder and operating upon an increase in brake pipe pressure to release position to connect the brake cylinder to atmosphere, means controlled by brake pipe and brake cylinder, pressures opposed to the pressure of an emergency reservoir for actuating said independent valve, and means whereby said pressure controlling valve will maintain the brake cylinder pressure in direct proportion to the brake pipe reduction.

13. A triple valve for air brake apparatus comprising a main slide valve, a graduating valve, a piston connected to said valves and subject on one side to brake pipe pressure and on its other side to auxiliary reservoir pressure and operating upon an increase of brake pipe pressure to move the said valves to release position to connect the brake cylinder to a main exhaust port and to open communication from the brake pipe to auxiliary reservoir, and operating upon a reduction of brake pipe pressure to move said valves to application position to connect the auxiliary reservoir to the brake cylinder and to close communication from the brake pipe to auxiliary reservoir, said communication with the brake cylinder being closed upon an equalization of pressures in the brake pipe and in the auxiliary reservoir whereby a certain volume of air will be discharged from the auxiliary reservoir to the brake cylinder for a given brake pipe reduction, a quick release valve controlling a main exhaust through the main slide valve and adapted to be manually operated to render the main exhaust through the main slide valve ineffective in release operations, a secondary independent valve operating upon a decrease in brake pipe pressure to connect a supplementary reservoir to the brake cylinder and operating upon an increase in brake pipe pressure to release position to connect the brake cylinder to atmosphere, means controlled by brake pipe and brake cylinder pressures opposed to the pressure of an emergency reservoir for actuating said independent valve, means whereby said pressure controlling valve will maintain the brake cylinder pressure in direct proportion to the brake pipe reduction the brake cylinder pressure moving said independent valve to release position when said pressure exceeds the desired brake cylinder pressure, and emergency reservoir pressure moving said valve to application position when the brake cylinder pressure is below the desired brake cylinder pressure.

14. A triple valve for air brake apparatus comprising a main slide valve, a graduating valve, a piston connected to said valves and subject on one side to brake pipe pressure and on its other side to auxiliary reservoir pressure and operating upon an increase of brake pipe pressure to move the said valves to release position to connect the brake cylinder to a main exhaust port and to open communication from the brake pipe to auxiliary reservoir and operating upon a reduction of brake pipe pressure to move said valves to application position to connect the auxiliary reservoir to the brake cylinder and to close communication from the brake pipe to auxiliary reservoir, said communication with the brake cylinder being closed upon an equalization of pressures in the brake pipe and in the auxiliary reservoir whereby a certain volume of air will be discharged from the auxiliary reservoir to the brake cylinder for a given brake pipe reduction, a secondary independent brake cylinder pressure controlling valve adapted in service position to connect a supplementary reservoir to the brake cylinder through a cavity in the main slide valve when said slide valve is in service application position, and means controlled by brake pipe and brake cylinder pressures opposed to the pressure of an emergency reservoir for actuating said independent pressure controlling valve.

15. An air brake apparatus comprising an emergency reservoir, an auxiliary reservoir, a supplementary reservoir, a brake cylinder, a brake pipe, a main valve device and a secondary valve device both of said devices being operated by a reduction of brake pipe pressure, the main valve device closing communication between brake pipe and auxiliary reservoir and placing the auxiliary reservoir in communication with the brake cylinder and closing said brake cylinder communication upon an equalization of brake pipe and auxiliary reservoir pressures, whereby a certain volume of air will be discharged from the auxiliary reservoir into the brake cylinder for a given brake pipe reduction, said main valve device also operating upon a sudden reduction of brake pipe pressure to place the emergency reservoir and auxiliary reservoir in communication with the brake cylinder for an emergency application of the brakes, the secondary valve device placing the supplementary reservoir in communication with the brake cylinder and closing said communication when a predetermined brake cylinder pressure is secured from auxiliary reservoir and supplementary reservoir, said secondary valve device being controlled by brake pipe, brake cylinder and emergency reservoir pressures, and means whereby the main slide valve in service position will connect the brake cylinder with the brake pipe and to the supplemental reservoir through passages controlled by the independent valve when said valve is in service position, said main slide valve in service position also connecting the brake cylinder to atmosphere through passages controlled by the independent valve when said independent valve is in release position.

16. An air brake apparatus comprising an emergency reservoir, an auxiliary reservoir, a supplementary reservoir, a brake cylinder, a brake pipe, a main valve device and a secondary valve device both of said devices being operated by a reduction of brake pipe pressure, the main valve device closing communication between brake pipe and auxiliary reservoir and placing the auxiliary reservoir in communication with the brake cylinder and closing said brake cylinder communication upon an equalization of brake pipe and auxiliary reservoir pressures, whereby a certain volume of air will be discharged from the auxiliary reservoir into the brake cylinder for a given brake pipe reduction, said main valve device also operating upon a sudden reduction of brake pipe pressure to place the emergency reservoir and auxiliary reservoir in communication with the brake cylinder for an emergency application of the brakes, the secondary valve device placing the supplementary reservoir in communication with the brake cylinder and closing said communication when a predetermined brake cylinder pressure is secured from auxiliary reservoir and supplementary reservoir, said secondary valve device being controlled by brake pipe, brake cylinder and emergency reservoir pressures, means whereby the main slide valve in service position will connect the brake cylinder with the brake pipe and to the supplemental reservoir through passages controlled by the independent valve when said valve is in service position, said main slide valve in service position also connecting the brake cylinder to atmosphere through passages controlled by the independent valve when said independent valve is in release position, and means whereby the main slide valve in emergency position will close the passages controlled by the independent valve.

17. An air brake apparatus comprising an emergency reservoir, an auxiliary reservoir, a supplementary reservoir, a brake cylinder, a brake pipe, a main valve device and a secondary valve device, both of said devices being operated by a reduction of brake pipe pressure, the main valve device closing communication between brake pipe and auxiliary reservoir and placing the auxiliary reservoir in communication with the brake cylinder and closing said brake cylinder communication upon an equalization of brake pipe and auxiliary reservoir pressures, whereby a certain volume of air will be discharged from the auxiliary reservoir into the brake cylinder for a given brake pipe reduction, the secondary valve device placing the supplementary reservoir in communication with the brake cylinder and closing said communication when a predetermined brake cylinder pressure is secured from auxiliary reservoir and supplementary reservoir, said secondary valve device being controlled by brake pipe, brake cylinder and emergency reservoir pressures, and means whereby the main slide valve in emergency position will render the secondary valve device ineffective.

18. A triple valve for air brake apparatus comprising a main slide valve, a graduating valve, a piston connected to said valves and subject on one side to brake pipe pressure and on its other side to auxiliary reservoir pressure and operating upon an increase of brake pipe pressure to move the said valves to release position to connect the brake cylinder to a main exhaust port and to open communication from the brake pipe to auxiliary reservoir, and operating upon a reduction of brake pipe pressure to move said valves to application position to connect the auxiliary reservoir to the brake cylinder and to close communication from the brake pipe to auxiliary reservoir, said communication with the brake cylinder being closed upon an equalization of pressures in the brake pipe and in the auxiliary reservoir whereby a certain volume of air will be discharged from the auxiliary reservoir to the brake cylinder for a given brake pipe reduction, a secondary or pilot valve subject to brake pipe, brake cylinder and emergency reservoir pressures and operating upon a reduction in brake pipe pressure to connect a supplementary reservoir to the brake cylinder and operating upon an increase in brake pipe pressure to connect the brake cylinder to atmosphere, and means whereby the main slide valve in emergency position will render the secondary valve device ineffective.

19. An air brake apparatus comprising an emergency reservoir, an auxiliary reservoir, a supplementary reservoir, a brake pipe, a brake cylinder, main valve means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon an equalization of pressures in the brake pipe and in the auxiliary reservoir whereby a certain volume of air will be discharged from the auxiliary reservoir to the brake cylinder for a given brake pipe reduction, a secondary or pilot valve operating upon a reduction of brake pipe pressure to admit supplementary reservoir air only to the brake cylinder until a predetermined pressure is built up in said brake cylinder from the auxiliary reservoir and supplementary reservoir, whereby the predetermined pressure in the brake cylinder will be maintained regardless of brake cylinder leaks and variations in brake cylinder piston travel, means whereby the auxiliary reservoir pressure will hold the emergency reservoir sealed in the service position of the main valve means, and means whereby the main valve in emergency position will permit auxiliary reservoir pressure to open communication between emergency reservoir and the auxiliary reservoir for an emergency application of the brakes.

20. An air brake apparatus comprising a single brake pipe; an emergency reservoir; an auxiliary reservoir; a supplemental reservoir; means to charge all of said reservoirs upon an increase of pressure in the single brake pipe; a brake cylinder; means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon a substantial equalization of pressures in the brake pipe and in the auxiliary reservoir; and means operated by emergency reservoir pressure upon a reduction of brake pipe pressure to place the supplemental reservoir in communication with the brake cylinder, said means closing said communication when the combined brake cylinder pressure and reduced brake pipe pressure dominates the emergency reservoir pressure and thereafter controlling the degree of pressure retained in the brake cylinder.

21. An air brake apparatus comprising an emergency reservoir; an auxiliary reservoir; a supplementary reservoir; a brake pipe; a brake cylinder; main valve means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon an equalization of pressure in the brake pipe and in the auxiliary reservoir whereby a certain volume of air will be discharged from the auxiliary reservoir to the brake cylinder for a given brake pipe reduction, said main valve means operating upon an increase of brake pipe pressure to connect the brake cylinder to a main exhaust port; a secondary valve means operating upon a reduction of brake pipe pressure to place the supplementary reservoir in communication with the brake cylinder and close said communication when a predetermined brake cylinder pressure is secured from the auxiliary reservoir and supplementary reservoir, and operating upon an increase of brake pipe pressure to slowly release brake cylinder pressure, said secondary valve means being controlled by brake pipe, brake cylinder and emergency reservoir pressures; and manually operable means in one position rendering the secondary valve controlling in release operations and in another position rendering the main valve controlling in release operations.

22. An air brake apparatus comprising an emergency reservoir; an auxiliary reservoir; a supplementary reservoir; a brake pipe; a brake cylinder; main valve means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon an equalization of pressure in the brake pipe and in the auxiliary reservoir whereby a certain volume of air will be discharged from the auxiliary reservoir to the brake cylinder for a given brake pipe reduction, said main valve means operating upon an increase of brake pipe pressure to connect the brake cylinder to a main exhaust port; a secondary valve means operating upon a reduction of brake pipe pressure to place the supplementary reservoir in communication with the brake cylinder and close said communication when a predetermined brake cylinder pressure is secured from the auxiliary reservoir and supplementary reservoir, and operating upon an increase of brake pipe pressure to slowly release brake cylinder pressure, said secondary valve means being controlled by brake pipe, brake cylinder and emergency reservoir pressures; manually operable means in one position rendering the secondary valve controlling in release operations and in another position rendering the main valve controlling in release operations; and means whereby when the secondary valve is controlling the brake cylinder pressure will be released in direct ratio to the increase in brake pipe pressure.

23. An air brake apparatus comprising an emergency reservoir, an auxiliary reservoir, a supplementary reservoir, a brake cylinder, a brake pipe, and two valve devices operated by a reduction of brake pipe pressure, one closing communication between brake pipe and auxiliary reservoir and placing the auxiliary reservoir in communication with the brake cylinder and closing said brake cylinder communication upon an equalization of brake pipe and auxiliary reservoir pressures, whereby a certain volume of air will be discharged from the auxiliary reservoir into the brake cylinder for a given brake pipe reduction, the other valve device placing the supplementary reservoir in communication with the brake cylinder and closing said communication when a predetermined brake cylinder pressure is secured from the auxiliary reservoir and supplementary reservoir, said other valve device being controlled by variations in brake pipe and brake cylinder pressures and subject to emergency reservoir pressure.

24. An air brake apparatus comprising an emergency reservoir, an auxiliary reservoir, a supplementary reservoir, a brake cylinder, a brake pipe, a main valve device and a secondary valve device both of said devices being operated by a reduction of brake pipe pressure, the main valve device closing communication between the brake pipe and auxiliary reservoir and placing the auxiliary reservoir in communication with the brake cylinder and closing said brake cylinder communication upon an equalization of brake pipe and auxiliary reservoir pressures, whereby a certain volume of air will be discharged from the auxiliary reservoir into the brake cylinder for a given brake pipe reduction, said main valve device also operating upon a sudden reduction of brake pipe pressure to place the emergency reservoir and auxiliary reservoir in communication with the brake cylinder for an emergency application of the brakes, the secondary valve device placing the supplementary reservoir in communication with the brake cylinder and closing said communication when a predetermined brake cylinder pressure is secured from auxiliary reservoir and supplementary reservoir, said secondary valve device being controlled by variations in brake pipe and brake cylinder pressures and subject to emergency reservoir pressure.

25. An air brake apparatus comprising an emergency reservoir, an auxiliary reservoir, a supplementary reservoir, a brake pipe, a brake cylinder, main valve means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon an equalization of pressure in the brake pipe and in the auxiliary reservoir whereby a certain volume of air will be discharged from the auxiliary reservoir to the brake cylinder for a given brake pipe reduction, said main valve means operating upon an increase of brake pipe pressure to connect the brake cylinder to a main exhaust port, a secondary valve means operating upon a reduction of brake pipe pressure to place the supplementary reservoir in communication with the brake cylinder and close said communication when a predetermined brake cylinder pressure is secured from the auxiliary reservoir and supplementary reservoir, and operating upon an increase of brake pipe pressure to slowly release brake cylinder pressure to a secondary exhaust port, said secondary valve means being controlled by variations in brake pipe and brake cylinder pressures and subject to emergency reservoir pressure, and manually operable means in one position rendering the main exhaust means ineffective and the secondary exhaust means effective and in another position rendering the main exhaust means effective.

26. An air brake apparatus comprising a single brake pipe; an emergency reservoir; an auxiliary reservoir; a supplemental reservoir; means to charge all of said reservoirs upon an increase of pressure in the single brake pipe; a brake cylinder; means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon a substantial equalization of pressures in the brake pipe and in the auxiliary reservoir; and means operated by emergency reservoir pressure upon a reduction of brake pipe pressure to place the supplemental reservoir in communication with the brake cylinder, said means closing said communication when the increasing brake cylinder pressure dominates the emergency reservoir pressure.

27. An air brake apparatus comprising an emergency reservoir; an auxiliary reservoir; a supplementary reservoir; a brake pipe; a brake cylinder; main valve means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon an equalization of pressure in the brake pipe and in the auxiliary reservoir whereby a certain volume of air will be discharged from the auxiliary reservoir to the brake cylinder for a given brake pipe reduction, said main valve means operating upon an increase of brake pipe pressure to connect the brake cylinder to a main exhaust port; a secondary valve means operating upon a reduction of brake pipe pressure to place the supplementary reservoir in communication with the brake cylinder and close said communication when a predetermined brake cylinder pressure is secured from the auxiliary reservoir and supplementary reservoir, and operating upon an increase of brake pipe pressure to slowly release brake cylinder pressure, said secondary valve means being controlled by variations in brake pipe and brake cylinder pressures and subject to emergency reservoir pressure; and manually operable means in one position rendering the secondary valve controlling in release operations and in another position rendering the main valve controlling in release operations.

28. An air brake apparatus comprising an emergency reservoir; an auxiliary reservoir; a supplementary reservoir; a brake pipe; a brake cylinder; main valve means subject to brake pipe pressure and auxiliary reservoir pressure and operating upon a reduction in brake pipe pressure to open communication between the auxiliary reservoir and the brake cylinder and to close communication between the brake pipe and auxiliary reservoir, said communication with the brake cylinder being closed upon an equalization of pressure in the brake pipe and in the auxiliary reservoir whereby a certain volume of air will be discharged from the auxiliary reservoir to the brake cylinder for a given brake pipe reduction, said main valve means operating upon an increase of brake pipe pressure to connect the brake cylinder to a main exhaust port; a secondary valve means operating upon a reduction of brake pipe pressure to place the supplementary reservoir in communication with the brake cylinder and close said communication when a predetermined brake cylinder pressure is secured from the auxiliary reservoir and supplementary reservoir, and operating upon an increase of brake pipe pressure to slowly release brake cylinder pressure, said secondary valve means being controlled by variations in brake pipe and brake cylinder pressures and subject to emergency reservoir pressure; manually operable means in one position rendering the secondary valve controlling in release operations and in another position rendering the main valve controlling in release operations; and means whereby when the secondary valve is controlling the brake cylinder pressure will be released in direct ratio to the increase in brake pipe pressure.

In testimony whereof I hereunto affix my signature.

SPENCER G. NEAL.